(12) United States Patent
Strutton et al.

(10) Patent No.: US 10,970,741 B2
(45) Date of Patent: Apr. 6, 2021

(54) METHOD AND SYSTEM FOR INTEGRATING AUDIENCE DATA WITH A SOCIAL MEDIA SITE

(71) Applicant: Oracle International Corporation, Redwood Shores, CA (US)

(72) Inventors: Michael J. Strutton, Villa Rica, GA (US); Chad Estes, Atlanta, GA (US); Stephanie Fossan, La Canada, CA (US); Eugene Thompson, Powder Springs, GA (US); Steven Keith Woods, Etobicoke (CA); Taha Sheikh, Mississauga (CA)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 14/491,365

(22) Filed: Sep. 19, 2014

(65) Prior Publication Data

US 2015/0081429 A1   Mar. 19, 2015

Related U.S. Application Data

(60) Provisional application No. 61/879,986, filed on Sep. 19, 2013.

(51) Int. Cl.
*G06Q 30/02* (2012.01)
*G06Q 50/00* (2012.01)

(52) U.S. Cl.
CPC ..... *G06Q 30/0251* (2013.01); *G06Q 30/0277* (2013.01); *G06Q 50/01* (2013.01)

(58) Field of Classification Search
CPC .......................... G06Q 30/0251; G06Q 50/01
See application file for complete search history.

(56) References Cited

U.S. PATENT DOCUMENTS

| | | | |
|---|---|---|---|
| 9,141,997 B2 | 9/2015 | Gaedcke et al. | |
| 9,384,473 B2* | 7/2016 | Shenoy | G06Q 10/10 |
| 9,483,802 B2 | 11/2016 | Gaedcke et al. | |
| 9,633,399 B2 | 4/2017 | George et al. | |
| 9,639,902 B2 | 5/2017 | Huehn et al. | |
| 9,823,813 B2* | 11/2017 | Beechuk | G06Q 50/01 |
| 2005/0015771 A1* | 1/2005 | Bagsby | G06Q 30/04 |
| | | | 718/106 |
| 2006/0136419 A1* | 6/2006 | Brydon | G06Q 10/107 |
| 2010/0091758 A1* | 4/2010 | Goteti | H04W 72/1268 |
| | | | 370/345 |
| 2010/0228617 A1* | 9/2010 | Ransom | G06Q 30/02 |
| | | | 705/14.25 |
| 2012/0143969 A1* | 6/2012 | Shenoy | G06Q 50/01 |
| | | | 709/206 |

(Continued)

OTHER PUBLICATIONS

"https://web.archive.org/web/20121009035415/http://developers.facebook.com/docs/reference/ads-api/custom-audience-targeting/" (Year: 2012).*

(Continued)

*Primary Examiner* — Waseem Ashraf
*Assistant Examiner* — Jonathan J Whitaker
(74) *Attorney, Agent, or Firm* — Invoke

(57) ABSTRACT

Disclosed is an improved approach for implementing a system, method, and computer program product for integrating with a social media site, which can be used to create and configure a custom audience on the social media site.

23 Claims, 13 Drawing Sheets

(56) References Cited

U.S. PATENT DOCUMENTS

| | | | |
|---|---|---|---|
| 2013/0159081 A1* | 6/2013 | Shastry | G06Q 30/0274 705/14.23 |
| 2014/0012659 A1* | 1/2014 | Yan | G06Q 30/0241 705/14.42 |
| 2014/0122571 A1* | 5/2014 | Huang | G06F 17/3089 709/203 |
| 2014/0130182 A1* | 5/2014 | Yackanich | G06F 21/60 726/27 |
| 2014/0180788 A1 | 6/2014 | George et al. | |
| 2014/0278855 A1* | 9/2014 | Clark | G06Q 30/0211 705/14.13 |

OTHER PUBLICATIONS

Andrea Vahl, How to Analyze Your Email Newsletter With Facebook, Jan. 29, 2013, "https://www.socialmediaexaminer.com/facebook-power-editor/" (Year: 2013).*

Joshua Phillips, How to Import Email to Facebook, Oct. 7, 2012, Demand Media—Houston Chronicle, "https://web.archive.org/web/20121007002637/https://smallbusiness.chron.com/import-email-facebook-44162.html" (Year: 2012).*

'Custom Audience Targeting'. facebook Developers [online]. published on Oct. 9, 2012 [retrieved on Jan. 22, 2021]. Retrieved from the Internet: < https://web.archive.org/web/20121009035415/https://developers.facebook.com/docs/reference/ads-api/custom-audience-targeting/ >. (Year: 2012).*

'Ads on the Graph API'. facebook Developers [online]. published on Sep. 22, 2012 [retrieved on Jan. 29, 2021]. Retrieved from the Internet: < https://web.archive.org/web/20120922142602/http://developers.facebook.com/docs/reference/ads-api/ >. (Year: 2012).*

Chaney, Paul. '5 Social CRM Tools for Small Business'. Practical ECommerce [online]. [retrieved on Jan. 22, 2021], published on Feb. 25, 2013. Retrieved from the Internet: < https://www.practicalecommerce.com/5-Social-CRM-Tools-for-Small-Business >. (Year: 2013).*

* cited by examiner

```
{
  "created_at":"2013-08-15T19:56:45Z",
  "creator_id":2,
  "data_source_id":null,
  "delta_last":0,
  "description":"The custom audience description",
  "expected":0,
  "facebook":0,
  "fb_id":"6009499710985",
  "fbtype":4,
  "from_facebook":false,
  "id":23,
  "media_account_id":2,
  "name":"My Custom Audience",
  "origin_audience_id":null,
  "parent_audience_id":"0",
  "parent_category":"Custom",
  "root_bundle_id":1,
  "source_last":null,
  "status":"waiting",
  "subtype":0,
  "subtype_name":"Regular",
  "type_name":"Advertiser Generated",
}
```

FIG. 6

| | Get Custom Audiences |
|---|---|
| Method | GET |
| Function | Returns the list of custom audiences for the root bundle (client account) associated with the provided bundle identifier. The specified user must be a member of that "account". |
| URL | https://<server:port>/api/bundle/<bundle_id>/custom_audiences |
| Parameters | bundle_id - the identifier of either the root bundle or a sub-bundle for the user's account |
| Headers | Content-Type: application/json<br>X-Vitrue-API-Key:<an api key for a valid SRMA client application><br>X-Vitrue-User-id:<an SRM User id> |
| Return Data | JSON Array of Custom Audience objects<br>[{<br>  "created_at":"2013-08-15T19:56:45Z",<br>  "creator_id":"2,<br>  "data_source_id":null,<br>  "delta_last":0,<br>  "description":"The custom audience description",<br>  ...<br>},<br>...<br>}] |

FIG. 7A

| | Get Custom Audience |
|---|---|
| Method | GET |
| Function | Returns the custom audience with the given custom audience id for the root bundle (client account) associated with the provided bundle identifier. The specified user must be a member of that "account". |
| URL | https://<server:port>/api/bundle/<bundle_id>/custom_audiences/<custom_audience_id> |
| Parameters | • bundle_id - the identifier of either the root bundle or a sub-bundle for the user's account<br>• custom_audience_id - the identifier of the desired custom audience |
| Headers | • Content-Type: application/json<br>• X-Vitrue-API-Key:<an api key for a valid SRMA client application><br>• X-Vitrue-User-id:<an SRM User id> |
| Return Data | JSON Custom Audience object<br>{<br>"created_at":"2013-08-15T19:56:45Z",<br>"creator_id":2,<br>"data_source_id":null,<br>"delta_last":0,<br>"description":"The custom audience description",<br>...<br>} |

FIG. 7B

| | |
|---|---|
| \multicolumn{2}{c}{Add Users to Custom Audience} | |
| Method | PUT |
| Function | Adds the provided users/contacts to the custom audience with the given custom audience id for the root bundle (client account) associated with the provided bundle identifier. The specified user must be a member of that "account". |
| URL | https://<server:port>/api/bundle/<bundle_id>/custom_audiences/<custom_audience_id>/users |
| Parameters | • bundle_id - the identifier of either the root bundle or a sub-bundle for the user's account<br>• custom_audience_id - the identifier of the desired custom audience |
| Headers | • Content-Type: application/json<br>• X-Vitrue-API-Key:<an api key for a valid SRMA client application><br>• X-Vitrue-User-id:<an SRM User id> |
| Body | • "users" - List of hashed contact data as described by Facebook - https://developers.facebook.com/docs/reference/ads-api/custom-audience-targeting/ (See "Hashing" section)<br>• "source" - "Eloqua" \| "Siebel" \| "CSV"<br>• "campaign" - "Campaign" identifier/name from the source<br>• "set_id" - A GUID used to link multiple requests together (as from the same source set). |
| Return Data | JSON object<br>{<br>  "type" : "<result \| error>",<br>  "data": {<br>  "current_count" : "<count of submitted users/contacts> *or*<br>  "error_info": "<some message>"<br>} |

FIG. 7C

| | Reset Custom Audience |
|---|---|
| Method | POST |
| Function | Resets the contents of the custom audience with the given custom audience id for the root bundle (client account) associated with the provided bundle identifier with the provided users/contacts. The specified user must be a member of that "account". |
| URL | https://<server:port>/api/bundle/<bundle_id>/custom_audiences/<custom_audience_id>/users |
| Parameters | • bundle_id - the identifier of either the root bundle or a sub-bundle for the user's account<br>• custom_audience_id - the identifier of the desired custom audience |
| Headers | • Content-Type: application/json<br>• X-Vitrue-API-Key:<an api key for a valid SRMA client application><br>• X-Vitrue-User-id:<an SRM User id> |
| Body | • "users" - List of hashed contact data as described by Facebook - https://developers.facebook.com/docs/reference/ads-api/custom-audience-targeting/ (See "Hashing" section)<br>• "source" - "Eloqua" \| "Siebel" \| "CSV"<br>• "campaign" - "Campaign" identifier/name from the source<br>• "set_id" - A GUID used to link multiple requests together (as from the same source set). |
| Return Data | JSON object<br>{<br>"type" : "<result \| error>",<br>"data": {<br>"current_count" : <count of submitted users/contacts> *or*<br>"error_info": "<some message>"<br>} |

FIG. 7D

| | Delete Users from Custom Audience |
|---|---|
| Method | DELETE |
| Function | Resets the contents of the custom audience with the given custom audience id for the root bundle (client account) associated with the provided bundle identifier with the provided users/contacts. The specified user must be a member of that "account". |
| URL | https://<server:port>/api/bundle/<bundle_id>/custom_audiences/<custom_audience_id>/users |
| Parameters | • bundle_id - the identifier of either the root bundle or a sub-bundle for the user's account<br>• custom_audience_id - the identifier of the desired custom audience |
| Headers | • Content-Type: application/json<br>• X-Vitrue-API-Key:<an api key for a valid SRMA client application><br>• X-Vitrue-User-id:<an SRM User id> |
| Body | • "users" - List of hashed contact data as described by Facebook - https://developers.facebook.com/docs/reference/ads-api/custom-audience-targeting/ (See "Hashing" section)<br>• "source" - "Eloqua" | "Siebel" | "CSV"<br>• "campaign" - "Campaign" identifier/name from the source<br>• "set_id" - A GUID used to link multiple requests together (as from the same source set). |
| Return Data | JSON object<br>{<br>"type" : "<result | error>",<br>"data": {<br>"current_count" : <count of submitted users/contacts> *or*<br>"error_info": "<some message>"<br>} |

FIG. 7E

| Retrieve A User's Root Bundles | |
|---|---|
| Method | GET |
| Function | Returns a list of all root bundles to which the user identified by the provided access token belongs. |
| URL | https://<server:port>/api/root_bundles |
| Parameters | |
| Headers | • Content-Type: application/json<br>• X-Vitrue-API-Key:<an api key for a valid SRMA client application> |
| Return Data | JSON object<br>[{<br>"name" : "Company Foo",<br>"description": "<A description text block describing the account's purpose>",<br>"root_bundle_id" : <The identifier for this particular root bundle which will be used with other API calls.><br>},<br>...<br>] |

FIG. 7F

METHOD AND SYSTEM FOR INTEGRATING AUDIENCE DATA WITH A SOCIAL MEDIA SITE

CROSS-REFERENCE TO RELATED APPLICATIONS

The present application claims the benefit of priority to U.S. Provisional Application Ser. No. 61/879,986, filed on Sep. 19, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

Given the widespread availability and usage of the internet by consumers, many businesses have become interested in being able to effectively implement marketing solutions that can target consumers over the internet. To accomplish this, many marketers are now using enterprise applications and marketing automation tools to target prospects, execute marketing campaigns, send leads to sales in real time, and to convert marketing leads into actual sales. An exemplary example of a commercially available marketing automation product is the Eloqua product, available from Oracle Corporation of Redwood Shores, Calif.

With the prevalence and popularity of social media sites, many marketers are now also seeking to use the social media sites as a vehicle to deliver targeted advertisements to consumers and marketing prospects. To accomplish this, many marketers are using social relationship management tools to manage their interactions with social media sites. An exemplary example of a commercially available social relationship management tool is the SRM product available from Oracle Corporation of Redwood Shores, Calif.

Facebook is an example of a widely used social media site. As such, many companies are looking for more effective ways to use Facebook to efficiently direct advertisements to Facebook users. One way this can occur is by using the Custom Audience provided by Facebook to direct targeted advertisements to Facebook users. The custom audience feature allows marketers to identify their offline audiences among Facebook users, where information provided by the marketer can be used to match and specify custom audiences for advertisements.

The problem is that it may be difficult for organizations to use its internal data to match against Facebook users to form the custom audiences. In many cases, the organizations will need to engage in a costly and/or inefficient process to create its own custom process or tools to integrate its data with Facebook.

One possible approach to address this problem is to use existing combinations of enterprise applications and management tools to interface with the social media site. The problem with this approach, however, is that the applications/tools are tied together as products from the same vendor, which makes it difficult or impossible to be used by a company that chooses to use an application/tool from another vendor.

To address these issues, embodiments of the present invention provide a system, method, and computer program product for integrating with a social media site, where the applications/tools do not need to all be provided by the same vendor in order to integrate the organization's data. In some embodiments, an applications programming interface (API) is provided which is open enough to allow an organization to use a third party application (e.g., third party CRM application or marketing automation application) to integrate its data to create a customized set of data on a social media site (e.g., to create a custom audience on Facebook).

Other additional objects, features, and advantages of the invention are described in the detailed description, figures, and claims.

BRIEF DESCRIPTION OF FIGURES

The present invention is illustrated by way of example, and not by way of limitation, in the figures of the accompanying drawings and in which like reference numerals refer to similar elements and in which:

FIG. 6 illustrates an example schema of a custom audience object in accordance with some embodiments.

FIGS. 7A-7F illustrates actions available to internal/external client applications of the Custom Audience API in accordance with some embodiments.

DETAILED DESCRIPTION

Figure 1:
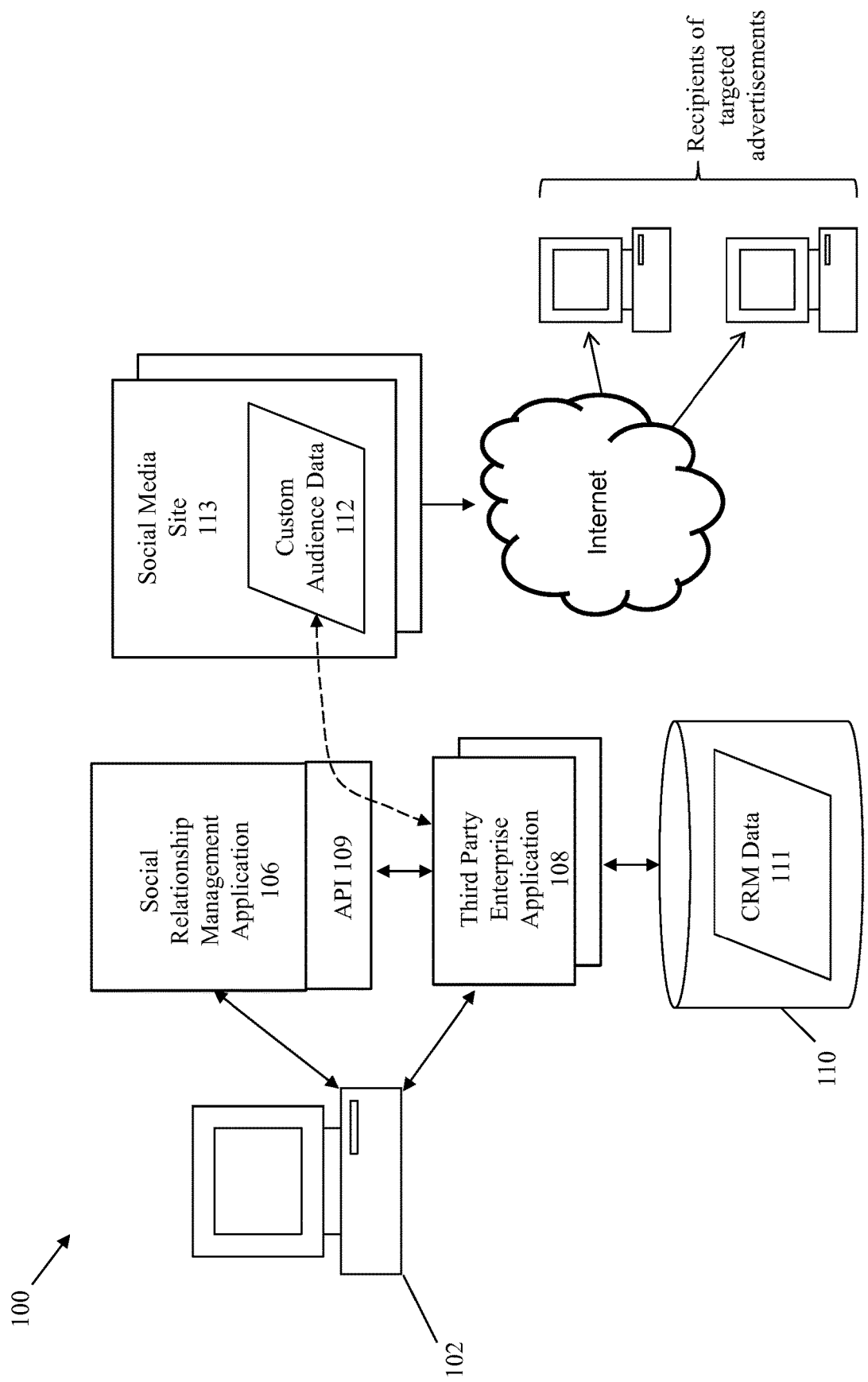
FIG. 1 illustrates an example system which may be employed to implement some embodiments of the invention.

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of SRM applications. It is noted, however, that the invention is not limited in its scope to SRM applications, and indeed, may be applied to other types of applications as well.

Embodiments of the present invention provide a system, method, and computer program product for integrating with a social media site, where the applications/tools do not need to all be provided by the same vendor in order to integrate the organization's data. In some embodiments, an applications programming interface (API) is provided which is open enough to allow an organization to use a third party application (e.g., CRM application) to integrate its data to create a customized set of data on a social media site (e.g., to create a custom audience on Facebook).

The embodiments of the invention are described illustratively herein in the context of creating Custom Audiences on Facebook. It is noted, however, that the invention may be applied to other types of functionality performed at any social media site. Therefore, the invention is not deemed to be limited in it application only to the functionality of creating and manipulating custom audience data, nor is the invention limited in its application only to Facebook, unless specifically claimed as such.

FIG. 1 illustrates an example system 100 which may be employed to implement some embodiments of the invention. The system 100 includes social relationship management application 106 (hereinafter, SRM application 106). The SRM application 106 comprises any set of functionality that is accessible to users of the system to perform management of content for social media sites. An exemplary example of a commercially available SRM application is the SRM product available from Oracle Corporation of Redwood Shores, Calif.

In the current embodiment of the invention, the SRM application 106 is used to manage the creation and/or configuration of the custom audience data 112 at one or more social media sites 113. The custom audience data 112 allows the social media sites 113 to, for example, direct targeted advertisements to its users across the internet. In some embodiments, users specified as part of the custom audience data 112 can be targeted for advertising, or excluded from targeting. For example, a marketer may wish to populate custom audience data 112 with social media users known to have purchased particular products within a certain period of time, so that those users can be excluded from being targeted with advertisements relating to those products.

The system 100 includes users that operate one or more enterprise applications 108. The enterprise applications 108 comprise any business-related applications that provide visibility and control over various aspects of a business. Such enterprise/business applications can include, without limitation, marketing automation applications, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Eloqua, E-Commerce ATG, Oracle Fusion, Oracle eBusiness Suite, JD Edwards Enterprise One, Oracle Cloud, PeopleSoft, and Siebel, all of which are available from Oracle Corporation of Redwood Shores, Calif.

In some embodiments, the enterprise applications 108 are used to generate data 111 that can be used to identify social media users to be included in a custom audience 112. Identification may be accomplished through sales prediction, behavioral tracking and analysis, and/or any other available method. The present invention allows the enterprise applications 108 to be used, implemented, and/or provided by entities that are entirely separate from the entity that provides or operates the SRM application 106. This means that the user of the system is not forced to purchase all of its applications from the same vendor with respect to the SRM application 106 and the enterprise application 108.

An applications programming interface (API) 109 is provided which is open enough to allow an organization to use a third party enterprise application 108 (e.g., CRM application) to integrate its data 111 (e.g., CRM data) to create a customized set of data 112 on a social media site 113 (e.g., to create a custom audience on Facebook). Details of an exemplary API implementation are described in more detail below.

The system 100 includes one or more users at one or more user stations 102 that use the system 100 to operate and interact with the SRM application 106, enterprise application 108, and/or social media site 113. The user station comprises any type of computing station that may be used to operate or interface with the marketing automation applications in the system 100. Examples of such user stations include, for example, workstations, personal computers, or remote computing terminals. User stations may also include mobile devices such as a smartphone or tablet. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs to the enterprise application and/or social networking application.

Various items of data within the system 100 may be implemented using data stored into a database in a computer readable storage device 110. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

Figure 2:
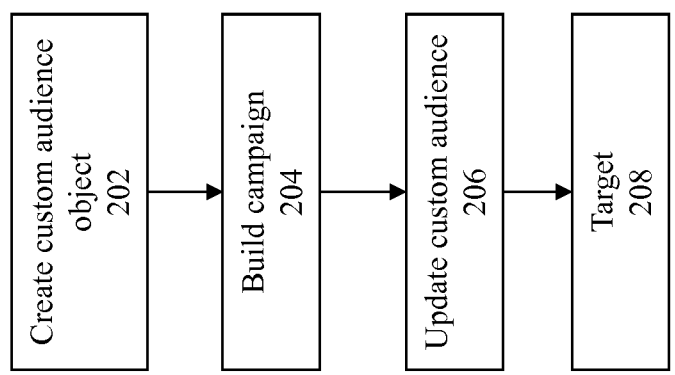
FIG. 2 illustrates a flowchart of a process for implementing/operations some embodiments of the invention.

FIG. 2 illustrates a flowchart of a process for implementing/operating some embodiments of the invention. At 202, a custom audience data object is created. This action may be performed, for example, by using the SRM application to create a new custom audience object. In some embodiments, the custom audience object is associated with a particular social media site (e.g., Facebook), while in other embodiments, the custom audience object may be associated with a plurality of different social media sites.

When creating the new custom audience object, the SRM application may also cause a corresponding custom audience to be created at the associated social media site(s). It is assumed that the appropriate media account has been created at the social media site(s), and that the user of the SRM application (e.g., the marketer) has the appropriate access privileges to create the custom audience at both the SRM application and the social media site(s). In other embodiments, the custom audience object at the SRM application is linked to an existing custom audience at a social media site. For example, a user may create a new custom audience on Facebook using Facebook's own custom audience mechanisms, and then link the custom audience on Facebook to a custom audience object at the SRM, in order to be able to add/delete social media users through the SRM.

The custom audience functions similarly to a bucket into which social media users may be placed, in order to select or exclude those social media users from targeted advertising at the social media site. In some embodiments, an initial set of one or more social media users may be used to populate the newly created custom audience object and the corresponding custom audience on the social media site. In other embodiments, the new custom audience object and the corresponding custom audience on the social media site may initially be empty.

At 204, a marketing campaign is constructed that pertains to the custom audience. The marketing campaign comprises a processing flow, where its sequence corresponds to actions that are used to identify one or more individuals and/or prospects for the marketing campaign. The campaign may be constructed using any type of application or tool capable of determining one or more social media users or prospects to be targeted for marketing or engagement. These types of applications may include, but are not limited to, e-commerce applications, customer relationship management applications, sales prediction engines, etc.

In some embodiments, the marketing campaign is created using a marketing automation tool provided by an enterprise application. The marketing automation tool can be configured to perform many types of marketing functions, such as targeting, engagement, conversion, and analytics. The marketing automation tool can perform targeting, for example, by capturing data about prospects from online interactions and/or online behavior from website visits, downloads, social networks, and searches. This allows profiles to be constructed to more accurately provide content alignment in the marketing materials. Engagement can be implemented, for example, by using the marketing automation system to efficiently create campaigns, mapping a prospect's online behavior to display ad versions to individually target and personalize to the recipient, by curating content from the prospect's trusted networks (e.g., by analyzing what pages a prospect's network of friends/followers "like" or follow), and by tying social activities to leads, pipeline, and even revenue. Conversions can be facilitated by using the marketing automation system to implement better sales alignment, by aligning marketing and sales processes to boost revenue performance using profiles, content, and engagement. In addition, sales can be enabled by using pre-populated templates with consistent branded content that can be used to nurture and close deals. The marketing automation tool can also be used to provide analytics for the marketing activities, e.g., by using dashboards and closed-loop reporting tools. Marketing ROI can be obtained, by measuring marketing return on investment and report on performance from major initiatives to individual campaigns. Benchmarking can also be performed, by measuring against other marketers. An exemplary marketing automation tool is the Eloqua product, available from Oracle Corporation of Redwood Shores, Calif.

The campaign can thus be used to produce data specifying which prospects (e.g., social media site users) are to be targeted with what kinds of advertising or engagement. For example, the campaign may specify that social media users having a first type of demographic or behavioral profile should be targeted with a first type of advertising/engagement, while social media users having a second type of demographic or behavioral profile should be targeted with a second type of advertising/engagement.

At 206, the data pertaining to the custom audience is updated based upon the marketing campaign. An API can be provided to facilitate updates to the custom audience. The API may provide a set of standard functions and calls that can be used by the marketer to manipulate the custom audience data at the SRM application and the social media sites, thus functioning as a conduit between the marketing automation tools/enterprise applications and social media sites. This allows for the marketer to use data generated by the marketing campaign to be used by social media sites, without having to create specialized tools to interface with each social media site, or having to be familiar with the particular API formats of the individual social media sites. Instead, the marketer only needs to make calls to the custom audience API of the SRM application, which will automatically cause the appropriate functions to be performed at the social media sites.

In some embodiments, updating the custom audience comprises populating the custom audience with one or more social media users or groups of social media users based upon the targeting, engagement, and analytics performed by the campaign. For example, the campaign may specify that certain social media users should be targeted with particular ads and/or other types of engagement, or that certain social media users should be excluded from being targeted with particular ads. Social media users may also be removed from a custom audience. In some embodiments, the custom audience may also be reset and re-populated with a new set of users.

In addition, in some embodiments the custom audience data can be auto-updated as the campaign changes. As the marketing automation tool continues to perform marketing functions related to the campaign, users may be added to or removed from a custom audience (e.g., due to changes in their demographics and/or behavior). For example, if the marketing campaign specifies that users who have bought a product within a certain time period are excluded from being targeted with ads relating to the product, then as users buy the product, they may be removed from a targeting list or added to an exclusion list, causing the custom audience associated with the campaign to update accordingly. In addition, the types of targeting, engagement, or analytics of a campaign may change over time (e.g., as the marketer changes strategy or defines better algorithms for determining which users to target), necessitating corresponding changes in the custom audiences associated with the campaign.

In some embodiments, the SRM application may allow more than one campaign or application to be associated with a custom audience. In other words, a single set of custom audience data may be generated and maintained using calls from multiple different applications (e.g., a campaign generated using a marketing automation tool, and a campaign generated using an e-commerce tool). Calls from multiple applications can thus be received by the SRM application and integrated to form a single set of custom audience data. The SRM application may also receive calls from multiple applications for different sets of custom audience data. This allows for a marketer to take advantage of different types of applications, tools, and algorithms for determining how to target social media users.

Thereafter, at 208, the custom audience can be used for targeting purposes. For example, the custom audience can be used to target recipients of a social network advertisement.

In other embodiments, the custom audience can be used to exclude users of the social media site from being targeted with certain advertisements.

Figure 3:
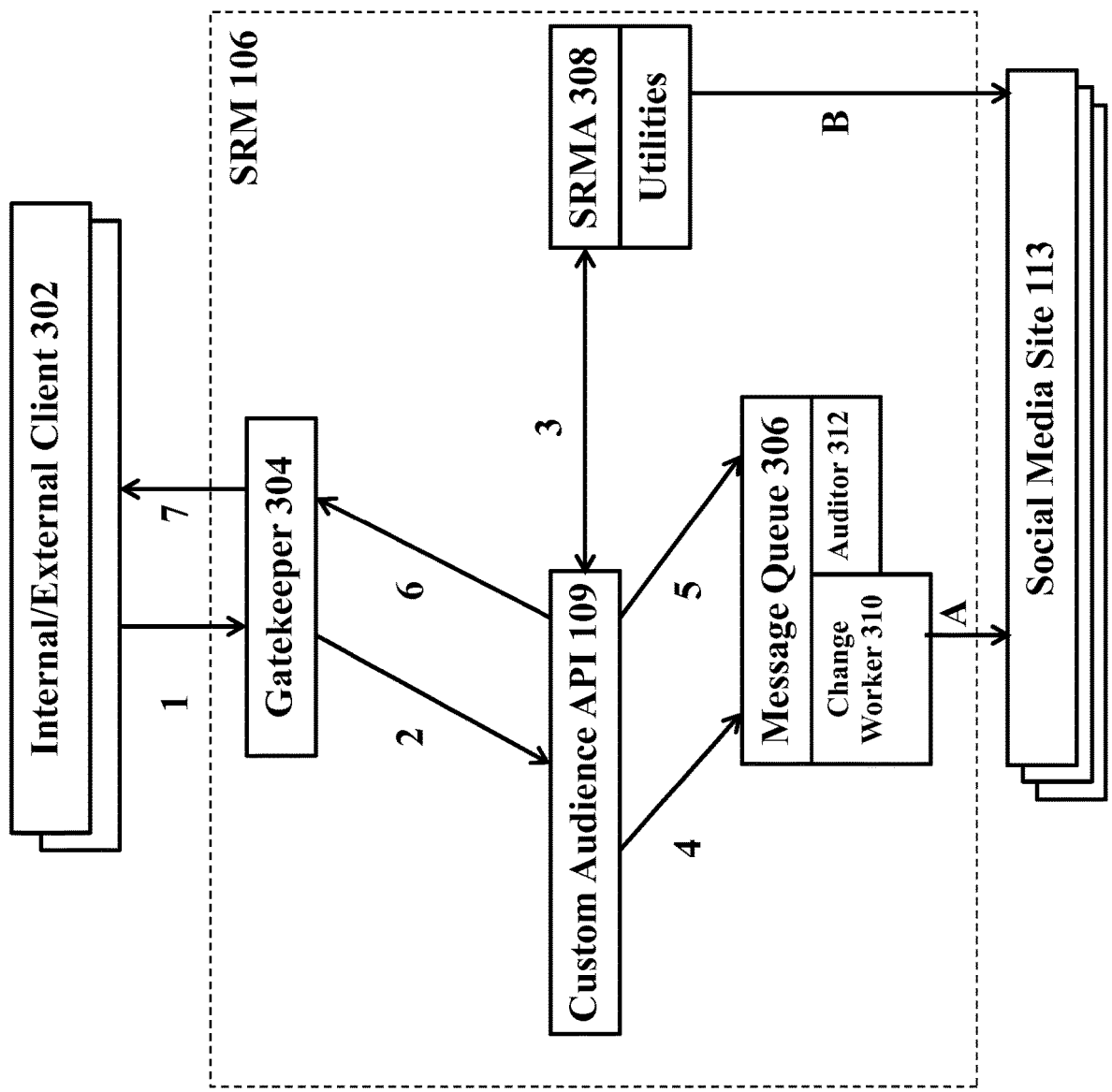
FIG. 3 provides a more detailed explanation of an illustrative approach to implement some embodiments of the invention.

FIG. 3 provides a more detailed explanation of an illustrative approach to implement some embodiments of the invention. The solution provides a mechanism for discovering, updating and deleting Custom Audiences on a social media site. This conduit may be used by internal and external applications to create targets for future media purchases, greatly expanding the capabilities and usefulness of their domain data (e.g. contact information).

As illustrated in FIG. 3, an internal/external client (hereinafter, client) 302 uses SRM 106 to interact with one or more social media sites 113. The client 302 may be an enterprise application or marketing automation tool (e.g., enterprise application 108, as illustrated in FIG. 1), or any other tool that may be used to generate or manipulate data relating to custom audiences. In some embodiments, client 302 may comprise multiple applications capable of generating or manipulating custom audience data.

In some embodiments, SRM 106 comprises a gatekeeper 304, custom audience API 109, a message queue 306, and an accounts mechanism (hereinafter, SRM Accounts or SRMA) 308. Each of these components will be described in further detail below.

At operation (1), client 302 sends an API service request to SRM 106, wherein the API service request corresponds to one or more operations to be performed on one or more custom audiences. Possible operations may include creating a new custom audience, adding one or more social media users to a custom audience, deleting one or more social media users from a custom audience, resetting a custom audience, etc. Available types of API service requests in accordance with some embodiments will be described in further detail in the "Custom Audience API" section below.

The API service request may be received by gatekeeper 304, which determines whether the user making the API request has the necessary permissions to make the request. In some embodiments, gatekeeper 304 identifies an access token (e.g., an OAuth 2.0 access token) included as part of the API request, and determines the identity of the user making the API request and the types of requests that they are allowed to make based upon the received access token. In some embodiments, in order to increase security and prevent malicious or unauthorized access, access tokens may only be valid only for a predetermined period of time (e.g., 2 hours). When an access token held by a client application 302 has expired, the client application 302 may use an associated "refresh" token to request a new access token. If gatekeeper 304 is able to authenticate the user, then the API service request is forwarded to the custom audience API 109 at operation (2). Otherwise, gatekeeper 304 may return an error to client 302.

Upon receiving the API service request, custom audience API 309 may verify the parameters of the received request using SRMA 308 at operation (3). In some embodiments, SRMA 308 is used to verify domain-related information that may not always be appropriate to store in gatekeeper 304. These may include determining if the user at client 302 has access to particular accounts (hereinafter also referred to as root bundles) in SRM 106, and whether the custom audiences specified in the API service request are associated with those accounts/root bundles.

For example, in some embodiments, a user may have access to multiple root bundles (e.g., the user is an advertising or marketing agency that performs advertising/marketing services a plurality of different clients, wherein each client is associated with a different account/root bundle). Each root bundle may have access to different resources, and be associated with a different set of custom audiences. While gatekeeper 304 verifies that the user may access SRM 106 for performing certain API requests, SRMA 308 verifies that the user is authorized to access a particular root bundle, that the root bundle is associated with the particular custom audience specified in the API service request, and that the user has permission to perform the requested operations on the particular custom audiences.

Once the API service request has been verified, custom audience API 109 may place the API service request into message queue 306 at operation (4). Because some service requests may take a significant amount of time to process, a message queue may be used in order to allow the API service request to be executed at a later time from the initial placement of the request. For example, some service requests may involve updating a custom audience with thousands or even millions of social media site users. A particular social media site may only allow a certain number of social media site users to be processed at a time, or have other restrictions that may prevent a service request from being processed immediately. Storing the service requests in message queue 306 thus allows for the service requests to be executed asynchronously from the initial placement of the service requests, so that a user at client 302 does not have to wait for a first service request to finish processing before being able to issue additional service requests.

In addition to placing the API service request into message queue 306, custom audience API 109 may send an audit request to message queue 306 at operation (5). Because service requests are executed asynchronously from the requests, audit requests may be used to record progress of previously issued service requests. In some embodiments, an audit request is generated automatically for each service request, and records and stores logs of the actions performed by the service request in an auditor. In some embodiments, client applications 302 or other applications may be used to later access the logged data and display results of the actions to a user. How service requests and audit requests are processed will be described in additional detail below.

At operations (6) and (7), custom audience API 109 may return a confirmation to client 302 indicating that the API service request has been placed into message queue 306 to await processing. In some embodiments, the confirmation contains a job identifier associated with the service request, which client 302 may use to check on the state of the service request at a later time (e.g., by accessing logged data stored by an audit request).

Requests placed in message queue 306 may be executed asynchronously by one or more workers, which may include one or more change workers 310, and one or more auditors 312. Change workers 310 are used to perform the service requests on the custom audiences. On the other hand, auditors 312 are used to log operations performed by change workers 310, creating a record that can be later viewed by the user through the issuing of audit requests.

In operation (A), a change worker 310 receives an API request from the message queue 306 for processing, identifies the type of action to take (e.g., add users to custom audience, remove users from custom audience, etc.), and identifies the custom audience the action is to be performed on. From the identified custom audience, change worker 310 determines the social media site 113 associated with the custom audience, and sends the appropriate requests to the social media site 113. In addition, change worker 310 may update the custom audience object located at SRM 106 in accordance with the service request, such that the data maintained by the custom audience object at SRM 106 will match that of its corresponding custom audience at social media site 113.

In some embodiments, sending a service request to social media site 113 requires manipulating the data associated with the service request to a format corresponding to the particular social media site 113. For example, if the service request includes a list of social media users to be added to a custom audience on Facebook, change worker 310 will manipulate the list of names provided by the service request from the format used by custom audience API 109 to the one that can be processed by Facebook's own API. In some embodiments, this is done by accessing a plurality of mappings that map the functions of custom audience API 109 to those of the individual social media sites. SRM 106 may maintain a set of mappings for each social media site 113 interfaced with, allowing for users to perform service requests on custom audiences on the different social media sites without having to be familiar with the particular formats and API functions of each individual site.

Thus, once the social media site 113 corresponding to the custom audience specified in the service request has been identified, the correct set of mappings is retrieved and applied to the service request, so that the requested action can be performed on the custom audience at the social media site.

Upon completion, the change worker 310 may enqueue an audit item in the message queue with the results of the service request, which may be processed by auditors 312 to form a record of operations that have been performed.

In some embodiments, SRM 106 may implement a number of additional background utilities that can be used, illustrated in FIG. 3 as operation (B). One such background utility is a discovery service (e.g., a Custom Audience discovery service) that queries known social media accounts for the social media site (a financial construct that funds media purchases within the social media site) for newly opened or previously unknown Custom Audiences. Another utility is a status service (e.g., Custom Audience status service) that periodically queries the social media site for the current status of all known Custom Audiences. This data is stored and displayed via the SRMA UI providing monitoring functionality to the appropriate users (Media Managers, etc.). Thus, these services can be used to verify that the custom audiences created by SRM 106 are still valid, and to synchronize the custom audience data on the SRM 106 and social media sites 113. Thus, if the custom audience data at the social media site 113 has been changed via other means (e.g., a user may also change the custom audience data by logging into the social media site directly), the changes may be detected and reflected in the custom audience data at SRM 106.

Figure 4:
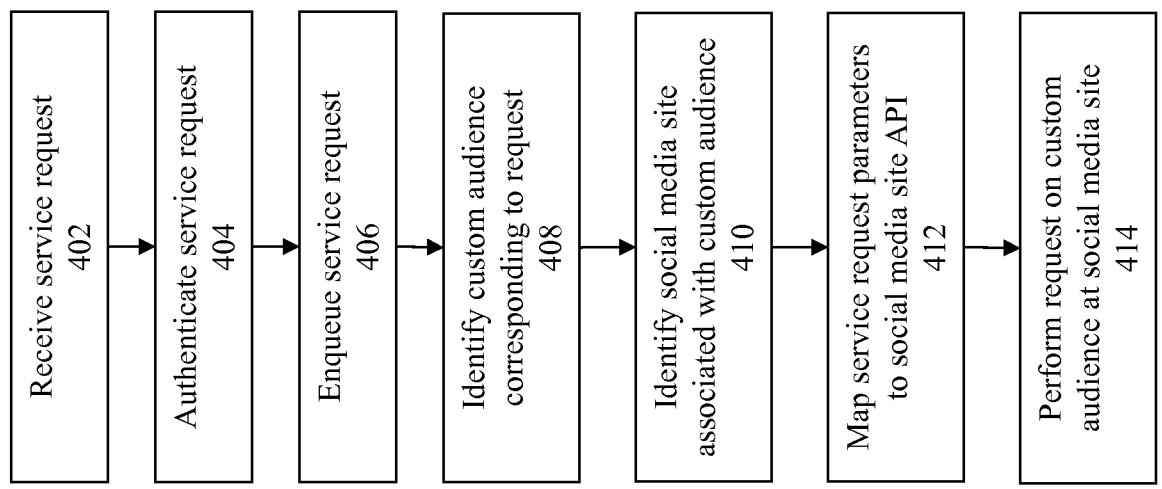
FIG. 4 illustrates a flowchart of a process for using a custom audience API to perform service requests on a custom audience on a social media site in accordance with some embodiments.

FIG. 4 illustrates a flowchart of a process for using a custom audience API to perform service requests on a custom audience on a social media site in accordance with some embodiments. At 402, a service request to perform an operation (e.g., add, remove, reset) on a custom audience in received. In some embodiments, the service request is issued by an enterprise application or marketing automation tool, and received by an SRM application that implements the custom audience API. For example, as the enterprise application or marketing automation tool produces data indicating which social media users or groups of social media users should be selected or excluded from targeting, the data may be used to automatically form service requests to create and maintain corresponding custom audiences on one or more social media sites. In some embodiments, requests can be received from multiple different applications/tools.

At 404, the received service request is authenticated. In some embodiments, the service request is checked to see if it was received from an authorized source. This may be done by checking one or more security credentials included with the received service request, such as a password or authentication token. In addition, after verifying that the service request originates from an authorized source, the service request may further be authenticated by verifying that the source of the service request has permission to access a particular account/root bundle, and that the custom audience to be operated upon is associated with the account/root bundle.

At 406, the service request may, in some embodiments, be enqueued in a message queue, allowing for the service request to be executed asynchronously from the receiving the request. In some embodiments, after a service request has been successfully enqueued, a confirmation is sent to the user or to the enterprise application/marketing automation tool. The confirmation may include a job number or identifier, allowing for the status of the service request to be checked at a later time.

At a later time, a change worker accesses the message queue and retrieves the service request for processing. At 408, the service request is analyzed to identify the custom audience to be operated upon. At 410, a social media site associated with the custom audience is identified. In some embodiments, each custom audience is associated with a particular social media site (e.g., "custom audience 1" is a Facebook custom audience, while "custom audience 2" is a Twitter custom audience). Custom audiences on different social media sites may have different structures or components specific to individual social media sites. In addition, a particular social media site may contain multiple different custom audiences used for different purposes or different types of targeting.

In some embodiments, a single custom audience at the SRM application may be associated with multiple social media sites, such that an operation performed on the custom audience at the SRM will be reflected in the custom audiences of each of the associated social media sites.

At 412, the custom audience API manipulates the format of the service request to a format corresponding with the social media site. In some embodiments, the custom audience API maintains a set of mappings for each social media site interfaced with, wherein the mappings map the functions of the custom audience API to the APIs of the different social media sites. This allows for all API service requests to be received in a standard custom audience API format regardless of which social media site that the custom audience being operated on is associated with, eliminating the need for the user of the enterprise application to have knowledge of the API formats used by each of the social media sites.

Based upon the social media site that the custom audience is associated with, the custom audience API retrieves the set of mappings associated with that social media site. By applying the mappings to the service request, the service request can thus be converted into a format that can be processed by the social media site to manipulate the custom audience on the social media site.

In some embodiments, the actual data of the service request (e.g., a list of users to be added to or deleted from a social network custom audience) is received in a format that is compatible with the social media site. For example, a user list of Facebook custom audience may have different formatting requirements compared to that of a Twitter custom audience. In other embodiments, the service request data is reformatted by the custom audience API based upon a formatting requirement of the social media site. This may allow for the service request data to be received in a single standard format, eliminating the need for the user of the enterprise application to have knowledge of the particular data format of the social media sites.

At 414, the action specified by the service request is performed on the custom audience at the social media site. In some embodiments, the SRM application accesses an account on the social media site, and sends the formatted service request to an API on the social media site. In some embodiments, the action is also performed on a custom audience object at the SRM application corresponding to the custom audience on the social media site. This allows the SRM application to maintain a set of custom audience data matching the custom audience data on the social media site.

Figure 5:
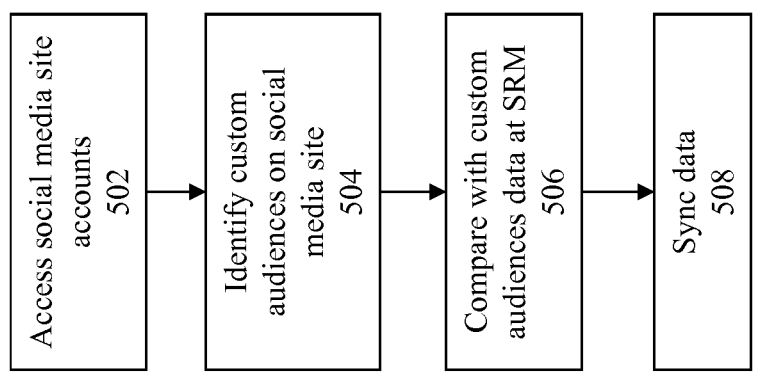
FIG. 5 illustrates a flowchart of a process implementing a background discovery and status service in accordance with some embodiments.

FIG. 5 illustrates a flowchart of a process implementing a background discovery and status service in accordance with some embodiments. In some embodiments, an SRM application may maintain a plurality of root bundles. Each root bundle may be associated with one or more social media site accounts. For example, a particular root bundle may be associated with a Facebook account for creating and maintaining Facebook custom audiences, and a LinkedIn account for creating and maintaining LinkedIn custom audiences. At 502, the SRM application accesses one or more social media accounts associated with a particular root bundle.

At 504, custom audiences associated with the accessed social media site accounts are identified. Each social media site account may be associated with a plurality of different custom audiences. For example, a Facebook account associated with a marketer may have a first custom audience for performing a first type of targeting, a second custom audience for performing a second type of targeting, and a third custom audience to be excluded from targeting.

At 506, the custom audience objects on the SRM application are compared with those on the accessed social media site accounts. The SRM identifies custom audience objects that are associated with a particular social media account, and compares the identified objects to the identified custom audience data from the social media site accounts.

At 508, the custom audience objects on the SRM are synchronized with the custom audiences on the social media sites. In some embodiments, if discrepancies exist between the custom audience objects on the SRM and the custom audience data from the social media site, the custom audience object on the SRM is modified such that it matches the custom audience data on the social media site. In some embodiments, if discrepancies are found, a message or notification is issued to the user or sent to the enterprise application for review.

Custom Audience API

FIG. 6 illustrates an example schema of a custom audience object in accordance with some embodiments. Each custom audience object may include a plurality of parameters, including the time the custom audience was created, an ID corresponding to the creator of the custom audience, the social media site the custom audience is associated with, the root bundle the custom audience is associated with, etc. Other parameters may include an indication of how much the custom audience was changed in a most recent modification (delta_last) and whether the custom audience was originally created via some other mechanism (e.g., the from_facebook parameter indicates if the custom audience was originally created directly on Facebook and later "dis- covered" by the SRM application through a background monitoring process). It is appreciated that the listed parameters are given for the purposes of example, and that in different embodiments, other schemas and other types of parameters may be used for the custom audience objects.

FIGS. 7A-7F illustrates actions available to internal/external client applications of the Custom Audience API in accordance with some embodiments. In the illustrated embodiment, each function corresponds to a URL specifying an address for resources associated with the function. In addition, the functions may comprise a header, a body, and zero or more function parameters. In some embodiments, the header specifies an ID corresponding to the user issuing the API request, and an API to be used by an SRMA used for internal authentication.

FIG. 7A illustrates a function for retrieving custom audiences associated with a particular root bundle in accordance with some embodiments. The function receives as input a bundle_id corresponding to a particular root bundle, and receives as output an array of zero or more custom audience objects that are associated with the root bundle. Thus, a user can use this function to quickly identify which custom audiences are available to a particular root bundle that he or she has access to.

FIG. 7B illustrates a function for retrieving a particular custom audience. The function receives as inputs a bundle_id corresponding to a particular root bundle, and a custom audience_id corresponding to a specific custom audience associated with the root bundle. The function returns the custom audience object corresponding to the received custom_audience_id.

The functions illustrated in FIGS. 7A and 7B can thus be used to establish a link between a campaign and a particular custom audience. A user may use the above functions in order to see what custom audiences are associated with a root bundle, and to select a particular custom audience. An identifier for the custom audience can then be stored at an enterprise application, allowing the enterprise application to perform operations on the custom audience using the custom audience identifier.

FIGS. 7C-7E illustrate functions for manipulating a custom audience. FIG. 7C illustrates a function for adding social media users to a custom audience in accordance with some embodiments. FIG. 7D illustrates a function for resetting a custom audience (i.e., delete all social media users currently in the custom audience before adding a new list of zero or more users) in accordance with some embodiments. FIG. 7E illustrates a function for deleting social media users from a custom audience in accordance with some embodiments.

The functions receive as inputs a bundle_id corresponding to a particular root bundle, and a custom audience_id corresponding to a specific custom audience associated with the root bundle. In addition, the body of the functions contains a list of social media users to be added to or deleted from the custom audience corresponding to custom_audience_id. The list of social media users may be stored in a file or document passed to the API (e.g., a .csv file). In addition, the body may include a source of the request (e.g., the enterprise application), a campaign ID associated with the source, and a set_id that can be used to group multiple add/delete/reset requests together. The functions may be configured to return as output an object indicating the results of the request, or returns an error indicating that the request has failed. This output may be used by an auditor in order to log the operations performed on the custom audiences.

FIG. 7F illustrates a function for retrieving all root bundles that a particular user has access to. In some embodiments, because the user may be identified in the header of the function (e.g., through a provided access token), there is no need to include additional input parameters. The function returns an array of objects, wherein each object specifies a root_bundle_id that the user has access to. Each object may also specify a company name associated with the root bundle, and a brief description of the root bundle.

Therefore, what has been described is an improved approach for implementing a system, method, and computer program product for integrating with a social media site. In the present embodiment, the applications/tools do not need to all be provided by the same vendor in order to integrate the organization's data. In some embodiments, an applications programming interface (API) is provided which is open enough to allow an organization to use a third party application (e.g., CRM application) to integrate its data to create a customized set of data on a social media site (e.g., to create a custom audience on Facebook).

System Architecture Overview

Figure 8:
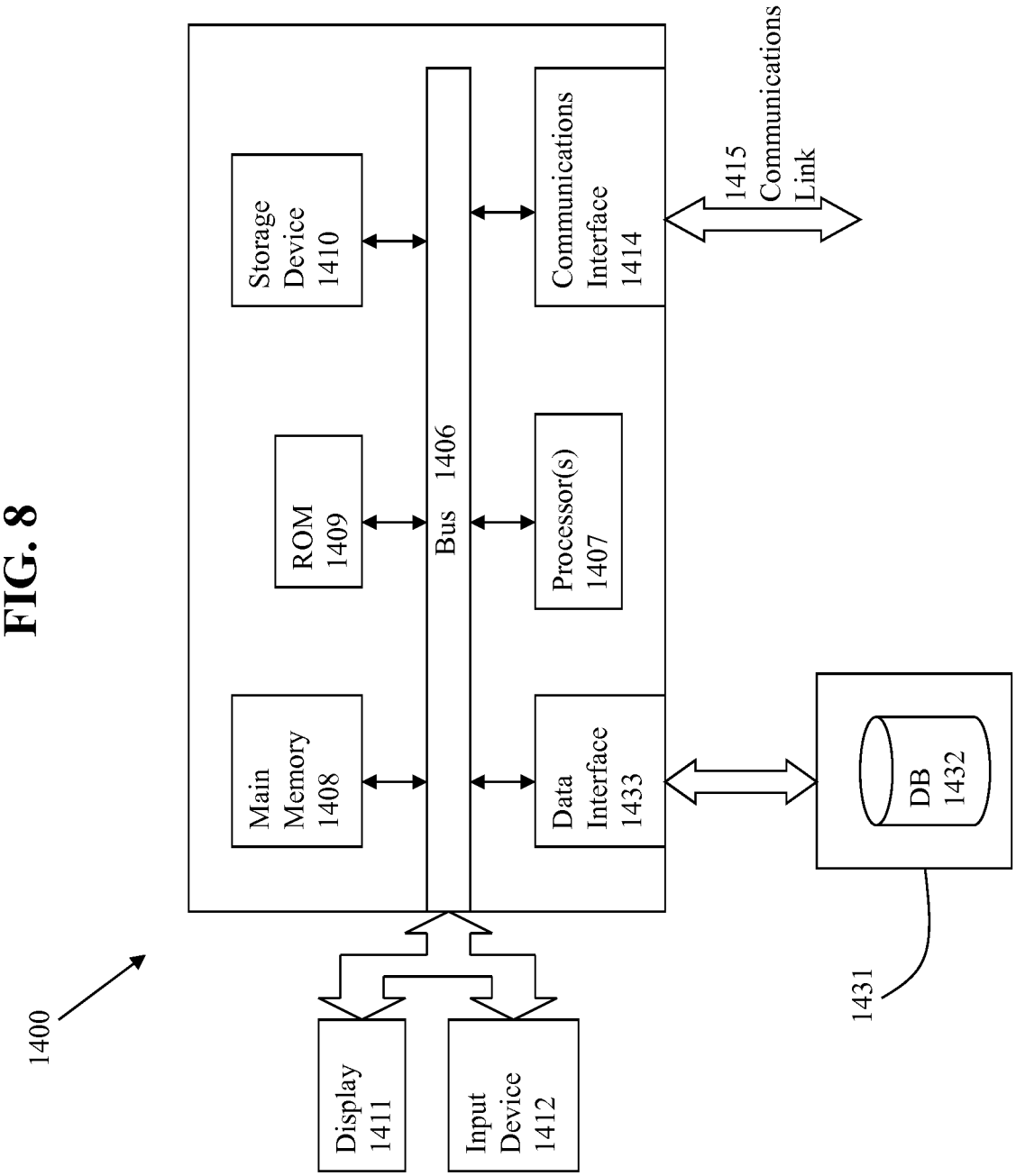
FIG. 8 shows an architecture of an example computing system with which the invention may be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for integrating contact data with social media sites, comprising:
    allowing, by a social relationship management (SRM) application operating independently of a social media site, access to an application programming interface (API) for defining a set of target user profiles for the social media site,
    wherein the SRM application is configured to store a plurality of bundles associated, respectively, with a plurality of SRM accounts,
    wherein the SRM application is configured to execute, responsive to receiving parameters via a plurality of functions defined by the API, operations corresponding to the plurality of functions,
    wherein a particular function in the plurality of functions is for adding contacts to custom audiences managed by the SRM application;
    receiving via the particular function defined by the API, from a first enterprise application operating independently of the SRM application and the social media site, a first service request comprising at least (a) a bundle identifier associated with a particular bundle in the plurality of bundles and (b) contact data from the first enterprise application;
    determining, based at least in part on a first access token, that the first enterprise application has access to the API of the SRM;
    determining, based at least in part on the bundle identifier, that the first service request is authorized to add contact data to the particular bundle;
    mapping one or more parameters of the first service request to an API format of the social media site;
    creating a first formatted service request based on the API format of the social media site;
    sending, by the SRM application to the social media site, the first formatted service request to update the set of target user profiles on the social media site;
    creating a custom audience object stored by the SRM application in the particular bundle, comprising a plurality of parameters in accordance with a particular object schema, wherein a value of at least one of the plurality of parameters is based on the first service request;

creating a campaign, by the SRM application, wherein the campaign specifies the set of target user profiles based on the custom audience object;

receiving via the particular function defined by the API, from a second enterprise application operating independently of the SRM application, the first enterprise application, and the social media site, a second service request comprising at least (a) the bundle identifier associated with the particular bundle in the plurality of bundles and (b) contact data from the second enterprise application;

determining, based on a second access token, that the second enterprise application has access to the API of the SRM;

determining, based at least in part on the bundle identifier, that the second service request is authorized to add contact data to the particular bundle;

updating the custom audience object in the particular bundle, by the SRM application, based on the second service request;

mapping one or more parameters of the second service request to the API format of the social media site;

creating a second formatted service request based on the API format of the social media site; and sending, by the SRM application to the social media site, the second formatted service request to update the set of target user profiles on the social media site.

2. The method of claim 1, wherein, based on the first formatted service request, the social media site adds one or more users to the set of target user profiles.

3. The method of claim 1, further comprising enqueuing, by the SRM application, the first service request in a message queue.

4. The method of claim 3, wherein the SRM application processes the first service request asynchronously from receiving the first service request.

5. The method of claim 1, further comprising:
accessing, by the SRM application, the social media site;
retrieving data associated with the set of target user profiles from the social media site;
performing a comparison of the data with the custom audience object stored by the SRM application; and
performing an action based at least in part upon a result of the comparison.

6. The method of claim 1, wherein updating the custom audience object is performed based at least in part upon a plurality of different campaigns using a plurality of different applications.

7. The method of claim 1, wherein the custom audience object stored by the SRM application is associated with a plurality of different social media sites.

8. The method of claim 1, further comprising:
receiving, via another function defined by the API, a third service request comprising at least (a) the bundle identifier associated with the particular bundle in the plurality of bundles and (b) replacement contact data; and
based on the third service request:
deleting contact data from the particular bundle, and
adding the replacement contact data to the particular bundle.

9. The method of claim 1, further comprising:
determining that a number of contacts in the contact data from the first enterprise application exceeds a number of contacts allowed by the social media site per request;
creating a second formatted service request based on the API format of the social media site, wherein the first formatted service request comprises a first subset of contacts that do not exceed the number of contacts allowed by the social media site per request, and wherein the second formatted service request comprises a second subset of contacts that do not exceed the number of contacts allowed by the social media site per request;

enqueuing the first formatted service request and the second formatted service request; and subsequent to sending the first formatted service request to update the set of target user profiles on the social media site: sending the second formatted service request to update the set of target user profiles on the social media site.

10. A non-transitory computer readable medium having stored thereon a sequence of instructions which, when executed by a processor causes the processor to execute operations comprising:

allowing, by a social relationship management (SRM) application operating independently of a social media site, access to an application programming interface (API) for defining a set of target user profiles for the social media site, wherein the SRM application is configured to manage a plurality of bundles associated, respectively, with a plurality of accounts, wherein the SRM application is configured to execute, responsive to receiving parameters via a plurality of functions defined by the API, operations corresponding to the plurality of functions, wherein a particular function in the plurality of functions is for adding contacts to custom audiences managed by the SRM application;

receiving via the particular function defined by the API, from a first enterprise application operating independently of the SRM application and the social media site, a first service request comprising at least (a) a bundle identifier associated with a particular bundle in the plurality of bundles and (b) contact data from the first enterprise application;

determining, based at least in part on a first access token, that the first enterprise application has access to the API of the SRM;

determining, based at least in part on the bundle identifier, that the first service request is authorized to add contact data to the particular bundle;

mapping one or more parameters of the first service request to an API format of the social media site;

creating a first formatted service request based on the API format of the social media site;

sending, by the SRM application to the social media site, the first formatted service request to update the set of target user profiles on the social media site;

creating a custom audience object stored by the SRM application in the particular bundle, comprising a plurality of parameters in accordance with a particular object schema, wherein a value of at least one of the plurality of parameters is based on the first service request;

creating a campaign, by the SRM application, wherein the campaign specifies the set of target user profiles based on the custom audience object;

receiving via the particular function defined by the API, from a second enterprise application operating independently of the SRM application, the first enterprise application, and the social media site, a second service request comprising at least (a) the bundle identifier associated with the particular bundle in the plurality of bundles and (b) contact data from the second enterprise application;

determining, based on a second access token, that the second enterprise application has access to the API of the SRM;

determining, based at least in part on the bundle identifier, that the second service request is authorized to add contact data to the particular bundle;

updating the custom audience object in the particular bundle, by the SRM application, based on the second service request;

mapping one or more parameters of the second service request to the API format of the social media site;

creating a second formatted service request based on the API format of the social media site; and sending, by the SRM application to the social media site, the second formatted service request to update the set of target user profiles on the social media site.

11. The computer readable medium of claim 10, wherein, based on the first formatted service request, the social media site adds one or more users to the set of target user profiles.

12. The computer readable medium of claim 10, further comprising enqueuing, by the SRM application, the first service request in a message queue.

13. The computer readable medium of claim 12, wherein the SRM application processes the first service request asynchronously from receiving the first service request.

14. The computer readable medium of claim 10, the operations further comprising:
accessing, by the SRM application, the social media site;
retrieving data associated with the set of target user profiles from the social media site;
performing a comparison of the data with the custom audience object stored by the SRM application; and
performing an action based at least in part upon a result of the comparison.

15. The computer readable medium of claim 10, wherein updating the custom audience object is performed based at least in part upon a plurality of different campaigns using a plurality of different applications.

16. The computer readable medium of claim 10, wherein the custom audience object stored by the SRM application is associated with a plurality of different social media sites.

17. A system, comprising:
a processor;
a memory comprising computer code executed using the processor, in which the computer code implements operations comprising:
allowing, by a social relationship management (SRM) application operating independently of a social media site, access to an application programming interface (API) for defining a set of target user profiles for the social media site,
wherein the SRM application is configured to manage a plurality of bundles associated, respectively, with a plurality of accounts,
wherein the SRM application is configured to execute, responsive to receiving parameters via a plurality of functions defined by the API, operations corresponding to the plurality of functions,
wherein a particular function in the plurality of functions is for adding contacts to custom audiences managed by the SRM application;
receiving via the particular function defined by the API, from a first enterprise application operating independently of the SRM application and the social media site, a first service request comprising at least (a) a bundle identifier associated with a particular bundle in the plurality of bundles and (b) contact data from the first enterprise application;

determining, based at least in part on a first access token, that the first enterprise application has access to the API of the SRM;

determining, based at least in part on the bundle identifier, that the first service request is authorized to add contact data to the particular bundle;

mapping one or more parameters of the first service request to an API format of the social media site;

creating a first formatted service request based on the API format of the social media site;

sending, by the SRM application to the social media site, the first formatted service request to update the set of target user profiles on the social media site;

creating a custom audience object stored by the SRM application in the particular bundle, comprising a plurality of parameters in accordance with a particular object schema, wherein a value of at least one of the plurality of parameters is based on the first service request;

creating a campaign, by the SRM application, wherein the campaign specifies the set of target user profiles based on the custom audience object;

receiving via the particular function defined by the API, from a second enterprise application operating independently of the SRM application, the first enterprise application, and the social media site, a second service request comprising at least (a) the bundle identifier associated with the particular bundle in the plurality of bundles and (b) contact data from the second enterprise application;

determining, based on a second access token, that the second enterprise application has access to the API of the SRM;

determining, based at least in part on the bundle identifier, that the second service request is authorized to add contact data to the particular bundle;

updating the custom audience object in the particular bundle, by the SRM application, based on the second service request;

mapping one or more parameters of the second service request to the API format of the social media site;

creating a second formatted service request based on the API format of the social media site; and sending, by the SRM application to the social media site, the second formatted service request to update the set of target user profiles on the social media site.

18. The system of claim 17, wherein, based on the first formatted service request, the social media site adds one or more users to the set of target user profiles.

19. The system of claim 17, further comprising enqueuing, by the SRM application, the first service request in a message queue.

20. The system of claim 19, wherein the SRM application processes the first service request asynchronously from receiving the first service request.

21. The system of claim 17, the operations further comprising accessing, by the SRM application, the social media site;
retrieving data associated with the set of target user profiles from the social media site;
performing a comparison of the data with the custom audience object stored by the SRM application; and performing an action based at least in part upon a result of the comparison.

22. The system of claim 17, wherein the custom audience object stored by the SRM application is updated based at least in part upon a plurality of different campaigns using a plurality of different applications.

23. The system of claim 17, wherein the custom audience object stored by the SRM application is associated with a plurality of different social media sites.

* * * * *